United States Patent [19]

Udagawa et al.

[11] Patent Number: 5,205,569
[45] Date of Patent: Apr. 27, 1993

[54] METAL LAMINATE GASKET WITH GRAPHITE SHEET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 900,789

[22] Filed: Jun. 22, 1992

Related U.S. Application Data

[63] Continuation-in-part of Ser. No. 673,892, Mar. 25, 1991, abandoned, which is a continuation-in-part of Ser. No. 193,215, May 11, 1988, Pat. No. 5,054,795, which is a continuation of Ser. No. 928,937, Nov. 10, 1986, abandoned.

[51] Int. Cl.5 ............................................. F16J 15/08
[52] U.S. Cl. ................................................. 277/235 B
[58] Field of Search ............... 277/235 B, 235 A, 233, 277/234, 231, 232

[56] References Cited

U.S. PATENT DOCUMENTS

| | | | |
|---|---|---|---|
| 2,055,471 | 9/1936 | Balft | 277/235 B |
| 2,330,106 | 9/1943 | Bernstein et al. | 277/235 B X |
| 3,841,289 | 10/1974 | Meyers | 277/235 B X |
| 4,325,559 | 4/1982 | Czernik et al. | 277/235 B |
| 4,807,892 | 2/1989 | Udagawa . | |
| 4,834,399 | 5/1989 | Udagawa et al. | 277/235 B X |
| 5,054,795 | 10/1991 | Udagawa et al. | 277/235 B X |

FOREIGN PATENT DOCUMENTS

| | | |
|---|---|---|
| 0328675 | 8/1989 | European Pat. Off. . |
| 3423787 | 2/1986 | Fed. Rep. of Germany ... 277/235 B |
| 2306078 | 10/1976 | France ............................. 277/235 B |
| 63-82056 | 8/1984 | Japan . |
| 118548 | 6/1986 | Japan ............................... 277/235 B |
| 1-211660 | 8/1989 | Japan . |
| 2-3044 | 1/1990 | Japan . |
| 2222639 | 3/1991 | United Kingdom ............ 277/235 B |

Primary Examiner—William A. Cuchlinski, Jr.
Assistant Examiner—Scott W. Cummings
Attorney, Agent, or Firm—Kanesaka and Takeuchi

[57] ABSTRACT

A metal laminate gasket of the invention is installed in an internal combustion engine having at least one hole therein. The gasket comprises a first metal plate, a second metal plate situated under the first metal plate, and a thin graphite layer attached to the second plate to face outwardly. The first plate includes a curved portion to define a first hole corresponding to the hole of the engine, and a flange around the first hole. The second plate has a second hole larger than the flange, so that when the first and second plates are assembled, the second plate does not pile the flange. The graphite layer fills dents or small scratches on an engine part when the gasket is installed in the engine.

6 Claims, 2 Drawing Sheets

METAL LAMINATE GASKET WITH GRAPHITE SHEET

CROSS-REFERENCE TO RELATED APPLICATION

This is a continuation in part application of Ser. No. 673,892 filed on Mar. 25, 1991, now abandoned which, in turn, is a continuation in part application of Ser. No. 193,215, filed on May 11, 1988 and U.S. Pat. No. 5,054,795, which, in turn, is a continuation application Ser. No. 928,937 filed on Nov. 10, 1986, now abandoned.

BACKGROUND OF THE INVENTION AND RELATED ART STATEMENT

The present invention relates to a steel laminate gasket of a very thin type with a graphite sheet.

A conventional steel laminate gasket is constructed by laminating several plates, and is provided with a complicated sealing portion around a hole to be sealed. Consequently, it is difficult to manufacture a steel laminate gasket with light weight. Also, productivity of a steel laminate gasket is poor. As a result, a steel laminate gasket is expensive more than other gaskets.

In a small engine, a gasket must be light weight and manufactured at a low cost. However, a conventional steel laminate gasket is heavy and expensive. Therefore, a conventional steel laminate gasket is not usually used for a small size engine.

On the other hand, when engine parts to which a gasket is attached, such as a cylinder head and a cylinder block, are manufactured, small projections, dents or scratches are formed on gasket attaching portions by cutter trace.

In order to securely seal between the engine parts by a gasket, it is necessary to fill the dents or scratches. Otherwise, fluid may leak through the dents or scratches especially when high pressure is applied to the gasket.

Conventionally, a coating is formed on an outer surface of the gasket in order to fill the dents or scratches. In case a soft coating, such as gum or synthetic resin, is applied on the gasket, the coating must be thin. Generally, the soft coating can be applied onto the gasket to fill the dents or scratches under 8-10 micrometers on the engine parts.

In case the dents or scratches are large or deep more than 8-10 micrometers, if a large amount of soft coating is applied onto the gasket, the soft coating causes flow in use, which reduces surface pressure on the gasket to cause leakage. Therefore, a large amount of a soft coating can not be applied onto the gasket.

In case the dents or scratches are deep more than 8-10 micrometers, therefore, the surface of the engine part are ground additionally for reducing the dents or scratches under 8-10 micrometers.

In U.S. Pat No. 3,841,289, graphite sheets are laminated on a metal plate, wherein when a gasket is tightened, the graphite sheets are compressed further to withstand variable cylinder pressure and temperature.

However, even if the graphite sheets are compressed at maximum density, if high heat and pressure are applied in use, the graphite sheets may partly flow to reduce surface pressure thereat.

Accordingly, one object of the present invention is to provide a steel laminate gasket, which is light in weight and simple in structure.

Another object of the invention is to provide a steel laminate gasket as stated above, which includes a material for filling dents or scratches on engine parts without causing flow in use.

Further objects and advantages of the invention will be apparent from the following description of the invention.

SUMMARY OF THE INVENTION

A metal laminate gasket of the invention is designed to be installed in an internal combustion engine having at least one hole therein. The gasket comprises a first metal plate and a second metal plate situated under the first metal plate. A thin graphite layer is attached to the second metal plate at an opposite side of the first plate.

The first plate includes a base section having at least one first hole corresponding to the hole of the engine, a flange situated under the base section around the first hole, and a curved portion situated between the flange and the base section to define the first hole.

The second plate includes at least one second opening, diameter of which is larger than the diameter of the flange. Therefore, when the first and second plates are assembled, the second plate is placed over the base section without laying over the flange. The thickness of the second plate is at most equal to that of the first plate so that when the gasket is tightened, the flange and base section seal basically around the hole of the engine.

The graphite layer has a thickness between 30 and 100 microns. When the gasket is tightened, the graphite layer fills dents or scratches on an engine part to which the graphite layer abuts or contacts. As a result, the gasket is closely fit to the engine part to improve sealing ability and can slide relative to the engine part.

Preferably, the second plate is made thinner than the first plate, but the thickness of the second plate with the graphite layer is made thicker than that of the first plate. Accordingly, when the gasket is tightened, the graphite layer is compressed to the thickness of the flange or the first plate. Therefore, the graphite layer fills small dents or grooves on the engine part.

When the gasket is tightened, the flange is compressed to provide high surface pressure for sealing around the hole of the engine, and the graphite layer is also compressed outside the flange to fill the dents or grooves and seal between the engine parts. Since the graphite layer is not located on the flange, when the gasket is tightened, the flange is strongly compressed. The surface pressure at the flange does not decrease so much as time passes.

Since the thickness of the graphite layer is reduced when the gasket is compressed, the surface pressure on the graphite layer does not decrease so much as time passes. When the gasket is compressed, high surface pressure is formed at the flange to seal around the hole, while moderate surface pressure seals outside the flange and seals around other holes.

The gasket may be further provided with a graphite layer between the first and second plates. In this case, the second plate must be thinner than the first plate and have resiliency.

DETAILED DESCRIPTION OF THE PREFERRED EMBODIMENT

Figure 1:
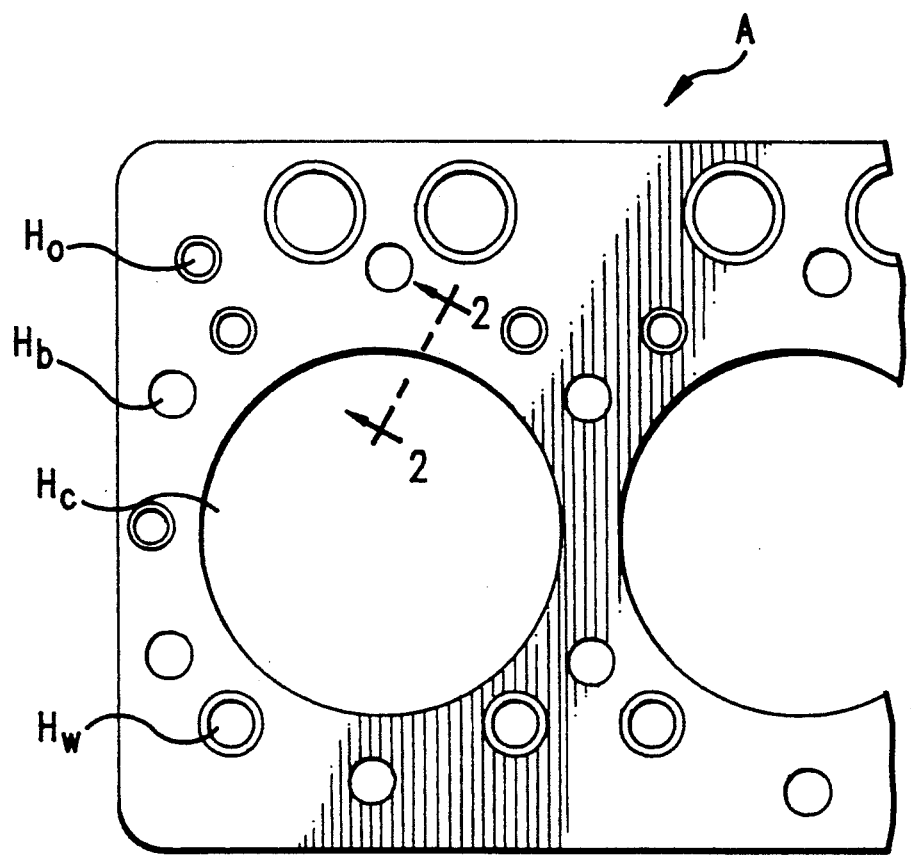
FIG. 1 is a plan view of a part of a first embodiment of a gasket of the invention.
Figure 2:
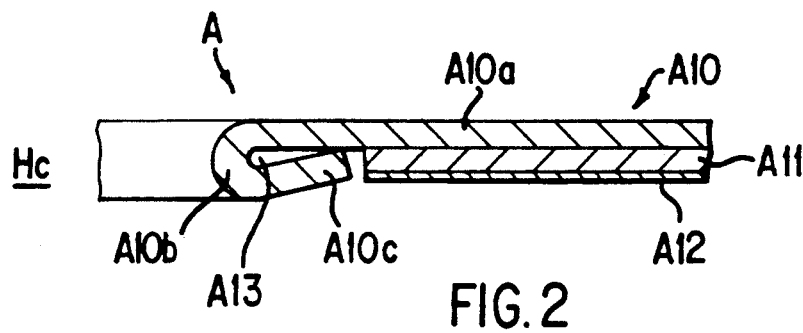
FIG. 2 is an enlarged section view taken along line 2—2 in FIG. 1.
Figure 3:
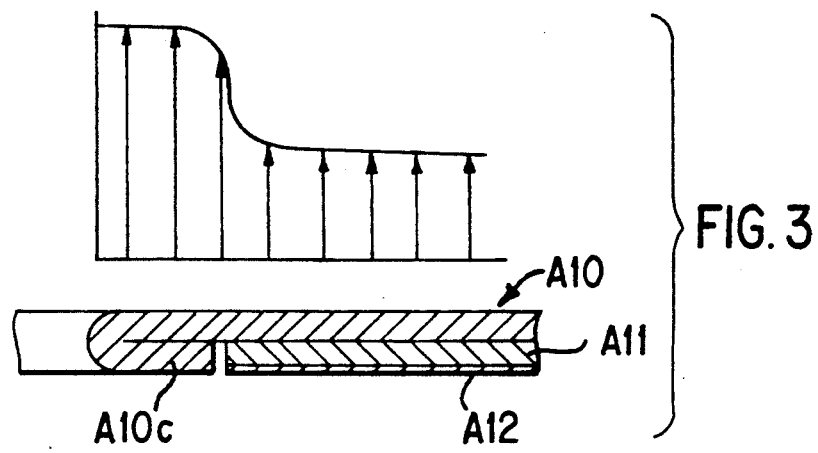
FIG. 3 is an explanatory section view for showing a condition that the gasket as shown in FIG. 2 is compressed.

Referring to FIGS. 1 to 3, a first embodiment A of a gasket of the invention is shown. The gasket A is a cylinder head gasket, and includes a cylinder bores Hc, water holes Hw, oil holes Ho and bolt holes Hb, as in the conventional gasket.

The sealing mechanism of the invention is applied around the cylinder bore Hc, but the same sealing mechanisms may be formed around other holes, or for other gaskets.

As shown in FIG. 2, the gasket A comprises an upper plate A10, and a lower plate A11 situated under the upper plate A10. A thin graphite sheet A12 is attached or glued under the lower plate A11.

The upper plate A10 includes a base section A10a extending substantially over the entire area of the gasket A, a curved portion A10b to define the cylinder bore Hc, and a flange A10c. A space A13 is formed between the base section A10a and the flange A10c adjacent the curved portion A10b.

The lower plate A11 situated under the upper plate A10 extends substantially over the entire area of the gasket A. The thickness of the lower plate A11 may be equal to or thinner than the thickness of the upper plate. In this embodiment, the lower plate A11 is made thinner than the upper plate A10. The lower plate A11 operates as a surface pressure regulation plate for the curved portion A10b and the flange A10c.

The graphite sheet A12 is flexible, and has density of 0.8–1.8 g/cm³ and thickness of 0.07 mm. The graphite sheet A12 is used to fill small scratches of a cylinder block (not shown). Also, the graphite sheet helps sealing between the gasket and the cylinder block and allows the gasket to slide relative to the cylinder block.

It is important that the graphite sheet must have a thickness between 30 and 100 microns. If the thickness is under 30 microns, the graphite sheet may not sufficiently fill small scratches of the cylinder block. If the thickness is over 100 microns, the graphite sheet may flow when high pressure and temperature are applied thereto, so that leakage may occur.

In the present invention, since the graphite sheet A12 is attached to the lower plate A11, the graphite sheet A12 is not directly exposed to the cylinder bore Hc. Namely, the graphite sheet A12 is not exposed to high temperature and pressure, so that the graphite sheet A12 does not flow in use.

In the present invention, when the gasket A is compressed between a cylinder head and a cylinder block (both not shown), the graphite sheet A12 attached to the lower plate A11 is strongly pushed against the cylinder block. Since the cylinder block has small scratches on the outer surface thereof due to cutter trace, the graphite sheet A12 fills the small scratches to form a smooth surface.

Accordingly, the gasket A can smoothly slide relative to the cylinder block when stress is formed therebetween according to expansion and contraction of the gasket and the cylinder block due to heat. Further, the graphite sheet A12 seals effectively relative to the cylinder block.

When the gasket A is tightened, the curved portion A10b is compressed so that the space A13 is flattened. Accordingly, the curved portion A10b provides a resilient surface pressure for sealing around the cylinder hole. Also, since the thickness of the flange is thicker than the lower plate A11, a large surface pressure is formed at the flange A10c, so that the area around the cylinder bore Hc is securely sealed at the flange A10c.

When the gasket A is tightened, the flange and the graphite sheet are compressed and form surface pressures. Especially, since the graphite sheet has the specific thickness, the graphite sheet does not substantially flow and provide surface pressure thereat. Therefore, even if a bead is not formed outside the flange, the cylinder bore Hc can be securely sealed.

In the gasket A, high surface pressure is formed at the flange A10c around the cylinder bore Hc and surface pressure less than that at the flange is formed outside the flange. Although the structure is simple, the gasket can securely seal around the cylinder bore. A bead is not required on the first and second plates.

Figure 4:
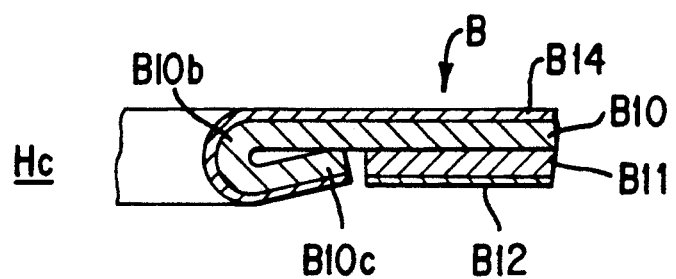
FIG. 4 is a section view, similar to FIG. 2, of a second embodiment of the invention.

FIG. 4 shows a second embodiment B of a metal gasket of the invention. The gasket B comprises an upper plate B10 with a curved portion B10b and a flange B10c, a lower plate B11, and a graphite sheet B12, as in the gasket A.

In the gasket B, however, a metal plating B14, which is known in the art, is formed on an outer surface of the upper plate B10. Since the metal plating B14 is strong against heat, the metal plating B14 is entirely formed at the upper plate B10 contacting the cylinder head and exposing the cylinder bore Hc. Although the metal plating B14 can not completely fill small scratches on the cylinder head, the metal plating B14 helps sealing between the gasket and the cylinder head.

In the present invention, the gasket is formed of two metal plates to provide a thin gasket. Nevertheless, the gasket can securely seal around the hole of the engine together with the thin graphite sheet. Moreover, even if a gasket attaching portion of the engine part is not smoothly formed, the gasket can fill small scratches and provide good sealing between the engine part and the gasket.

While the invention has been explained with reference to the specific embodiments of the invention, the explanation is illustrative and the present invention is limited only by the appended claims.

What is claim is:

1. A metal laminate gasket for an internal combustion engine having at least one hole therein comprising:

a first metal plate including a base section having at least one first hole corresponding to the hole of the engine, a flange situated under the base section around the first hole, and a curved portion situated between the flange and the base section to define the first hole, said base section and flange sealing around the first hole when the gasket is tightened, a second metal plate placed under the base section of the first plate, said second plate forming an outer plate of the gasket and having at least one second opening, the diameter of the second opening being larger than the diameter of the flange to permit the second plate to be placed over the base section without laying over the flange, the thickness of the second plate being less than that of the first plate, and a thin graphite layer attached to the second plate at an opposite side relative to the first plate, the thickness of the second plate with the graphite layer being greater than the thickness of the first plate so that when the gasket is tightened, the flange and the base section are compressed and deformed without providing substantial compressibility thereat to securely seal around the hole of the engine and the graphite layer is compressed on the second plate while providing surface pressure thereat and filling dents on an engine part to which the graphite layer abuts to thereby allow the gasket to closely fit to the engine part without using a bead and to improve sealing ability between the gasket and the engine part.

2. A metal laminate gasket according to claim 1, wherein the graphite layer has a thickness between 30 and 100 microns.

3. A metal laminate gasket according to claim 1, wherein said curved portion has resiliency to tightly seal around the first hole when the gasket is tightened.

4. A metal laminate gasket with a sealing layer for an internal combustion engine having at least one hole therein consisting essentially of:
   a first plate consisting essentially of metal and including a base section having at least one first hole corresponding to the hole of the engine, a flange situated under the base section around the first hole, and a curved portion situated between the flange and the base section to define the first hole having resiliency to tightly seal around the first hole when the gasket is tightened,
   a second plate consisting essentially of metal and placed over the base section of the first plate, said second plate forming an outer plate of the gasket and having at least one second opening without having a bead around the second opening, the diameter of the second opening being larger than the diameter of the flange to permit the second plate to be placed over and in direct contact with the base section without laying over the flange, the thickness of the second plate being thinner than that of the first plate, and
   a thin graphite layer attached to the second plate at an opposite side relative to the first plate, the thickness of the second plate with the graphite layer being greater than the thickness of the first plate so than when the gasket is tightened, the flange and the base section are compressed and deformed without providing substantial compressibility thereat to securely seal around the hole of the engine and said graphite layer is compressed on the second plate while providing surface pressure thereat and filling dents on an engine part to which the graphite layer abuts to thereby allow the gasket to closely fit to the engine part without using a bead and to improve sealing ability between the gasket and the engine part.

5. A metal laminate gasket according to claim 4, wherein the graphite layer has a thickness between 30 and 100 micron.

6. A metal laminate gasket according to claim 1, wherein said second plate has no sealing bead around the second opening.

* * * * *

UNITED STATES PATENT AND TRADEMARK OFFICE
CERTIFICATE OF CORRECTION

PATENT NO. : 5,205,569
DATED : April 27, 1993
INVENTOR(S) : Tsunekazu Udagawa and Susumu Inamura It is certified that error appears in the above-identified patent and that said Letters Patent is hereby corrected as shown below:

In column 5, claim 4, line 9, after "hole", please add --and--.

Signed and Sealed this

Seventh Day of December, 1993

*Attest:*

BRUCE LEHMAN

*Attesting Officer*     *Commissioner of Patents and Trademarks*